(12) United States Patent
Massie (10) Patent No.: US 6,928,863 B2
(45) Date of Patent: Aug. 16, 2005

(54) APPARATUS AND METHOD FOR ISOLATING AND MEASURING MOVEMENT IN A METROLOGY APPARATUS

(75) Inventor: James R. Massie, Santa Barbara, CA (US)

(73) Assignee: Veeco Instruments Inc., Woodbury, NY (US)

( * ) Notice: Subject to any disclaimer, the term of this patent is extended or adjusted under 35 U.S.C. 154(b) by 0 days.

(21) Appl. No.: 10/624,246

(22) Filed: Jul. 22, 2003

(65) Prior Publication Data
US 2004/0134264 A1 Jul. 15, 2004

Related U.S. Application Data

(63) Continuation-in-part of application No. 09/855,960, filed on May 15, 2001, now Pat. No. 6,530,268, which is a continuation-in-part of application No. 09/803,268, filed on Mar. 9, 2001, now Pat. No. 6,612,160.

(51) Int. Cl.$^7$ ............................ G01B 5/28; G01N 13/16
(52) U.S. Cl. ........................................................ 73/105
(58) Field of Search .............................. 73/105; 250/306

(56) References Cited

U.S. PATENT DOCUMENTS

| | | | |
|---|---|---|---|
| 5,172,002 A | 12/1992 | Marshall | 250/559.29 |
| 5,196,713 A | 3/1993 | Marshall | 250/559.31 |
| 5,298,975 A | * 3/1994 | Khoury et al. | 356/624 |
| 5,519,212 A | 5/1996 | Elings et al. | |
| 5,835,251 A | 11/1998 | Toda et al. | |
| 5,939,719 A | 8/1999 | Park et al. | |

* cited by examiner

Primary Examiner—Daniel S. Larkin
(74) Attorney, Agent, or Firm—Boyle Fredrickson Newholm Stein & Gratz S.C.

(57) ABSTRACT

A metrology apparatus includes an actuator with a first actuator stage to controllably move in first and second orthogonal directions, and a second actuator stage adjacent to the first actuator stage to controllably move in a third direction orthogonal to the first and second orthogonal directions. A coupling is coupled to the second actuator stage and to a multi-bar linkage assembly fixed to a second end of a reference structure. The linkage supports a sample holder and transmits appropriate displacements generated by the actuator thereof The second actuator stage and the coupling move the linkage in the third orthogonal direction in a manner that substantially isolates the linkage from any second actuator stage motion in the first and second directions. An objective is fixed to the reference structure and is located between a light source and a position sensor. The position sensor measures first actuator stage motion in the first and second directions.

47 Claims, 7 Drawing Sheets

APPARATUS AND METHOD FOR ISOLATING AND MEASURING MOVEMENT IN A METROLOGY APPARATUS

CROSS-REFERENCE TO RELATED APPLICATIONS

This application is a continuation-in-part of application U.S. Ser. No. 09/855,960, filed May 15, 2001, now U.S. Pat. No. 6,530,268, which is a continuation-in-part of application of U.S. Ser. No. 09/803,268, filed March 9, 2001 now U.S. Pat. No. 6,612,160, each of which is expressly incorporated by reference herein in its entirety.

BACKGROUND OF THE INVENTION

1. Field of the Invention

This invention relates to scanning probe microscopes (SPMs) and other related metrology apparatus. More particularly, it is directed to an apparatus and method for measuring the movement of a sample to be analyzed by an SPM, and to isolate its Z movement from parasitic X-Y movement generated by a Z actuator.

2. Discussion of the Prior Art

Figure 1A:
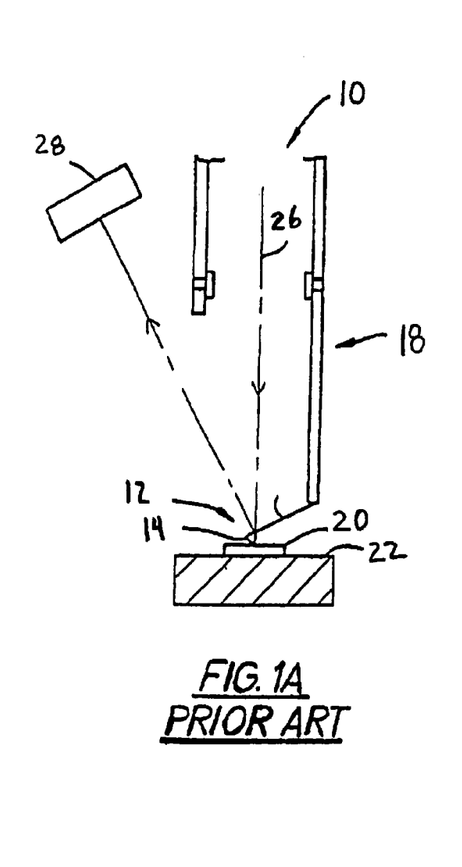
FIG. 1A is a partial side elevational view of a prior art atomic force microscope utilizing a scanned stylus and including a three-axis piezoelectric actuator assembly.
Figure 1B:
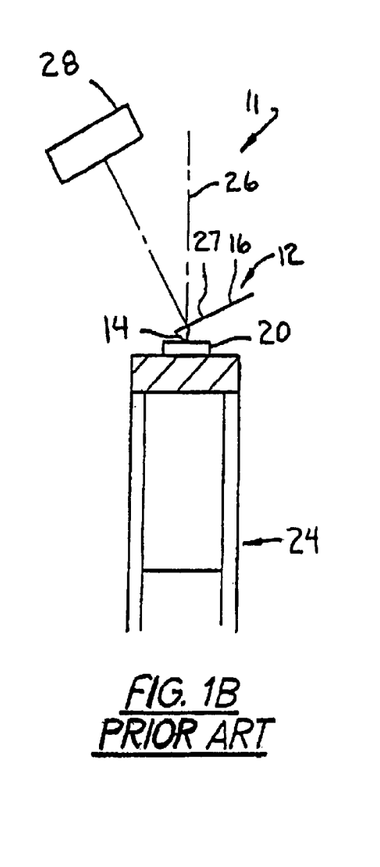
FIG. 1B is a partial side elevational view of a prior art atomic force microscope utilizing a scanned sample and including a three-axis piezoelectric actuator assembly.

A scanning probe microscope operates by providing relative scanning movement between a measuring probe assembly having a sharp stylus and a sample surface while measuring one or more properties of the surface. The examples shows in FIGS. 1A and 1B are atomic force microscopes 10 and 11 respectively ("AFMs") where a measuring probe assembly 12 includes a sharp tip or stylus 14 attached to a flexible cantilever 16. Commonly, an actuator such as a piezoelectric tube (often referred to herein as a "piezo tube") is used to generate relative motion between the measuring probe 12 and the sample surface. A piezoelectric tube is a device that moves in one or more directions when voltages are applied to electrodes disposed inside and outside the tube (29 in FIG. 1C).

In FIG. 1A, measuring probe assembly 12 is attached to a piezoelectric tube actuator 18 so that the probe may be scanned over a sample 20 fixed to a support 22. FIG. 1B shows an alternative embodiment where the probe assembly 12 is held in place and the sample 20, which is coupled to a piezoelectric tube actuator 24, is scanned under it. In both AFM examples in FIGS. 1A and 1B, the deflection of the cantilever 16 is measured by reflecting a laser beam 26 off the back side 27 of cantilever 16 and towards a position sensitive detector 28.

Figure 1C:
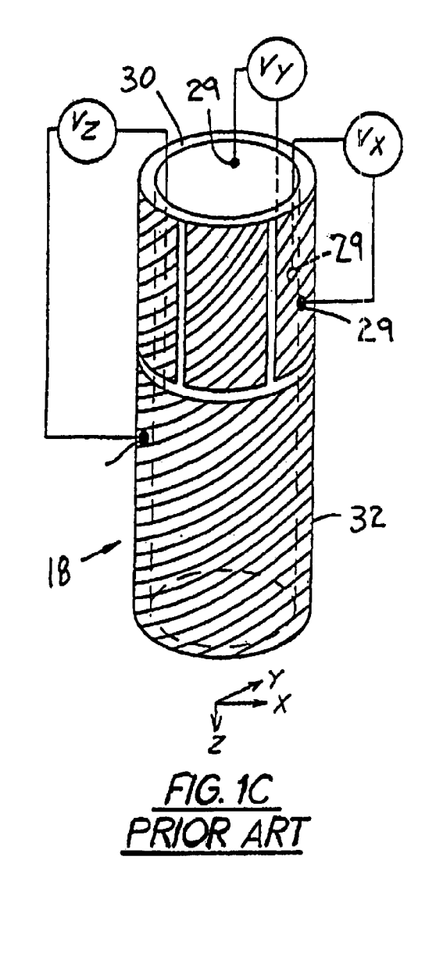
FIG. 1C is a perspective view of a prior art piezoelectric tube actuator of an atomic force microscope.

One of the continuing concerns with these devices is how to improve their accuracy. Since these microscopes 10, 11 often measure surface characteristics on the order of Ångstroms, positioning the sample and probe with respect to each other is critical. Referring to FIG. 1C, as implemented in the arrangement of FIG. 1A, when an appropriate voltage ($V_x$ or $V_y$) is applied to electrodes 29 disposed on the upper portion 30 of piezoelectric tube actuator 18, called an X and Y axis translating section or more commonly an "X-Y tube," the upper portion may bend in two axes, the X and Y axes as shown. When a voltage ($V_z$) is applied across electrodes 29 in the lower portion 32 of tube 18, called a Z axis translating section or more commonly a "Z-tube," the lower portion extends or retracts, generally vertically. In this manner, portions 30, 32 and the probe (or sample) can be steered left or right, forward or backward and up and down. This arrangement provides three degrees of freedom of motion. For the arrangement illustrated in FIG. 1A, with one end fixed to a microscope frame (for example, 34 in FIG. 1D), the free end of tube 18 can be moved in three orthogonal directions with relation to the sample 20. In addition with the X-Y tube 30 on top of the Z-tube 32 (i.e., furtherest from probe assembly 12), maximum X-Y range is realized.

Figure 1D:
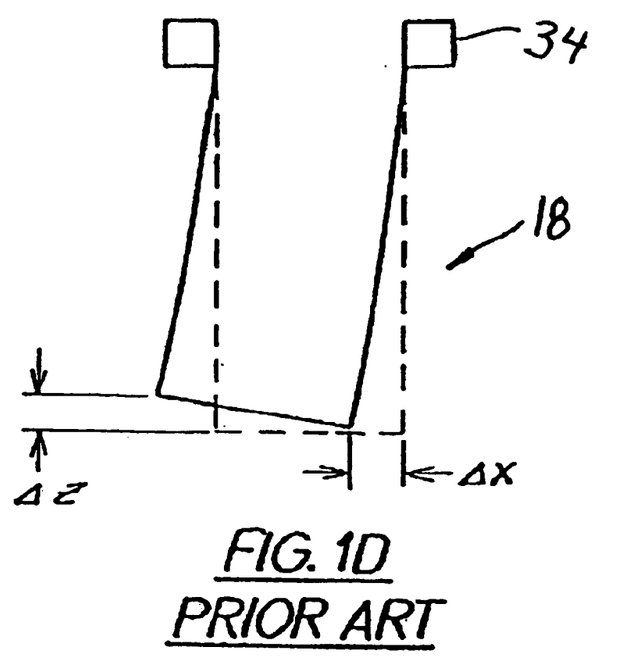
FIG. 1D is a front elevational view illustrating parasitic motion of a piezoelectric actuator assembly configured to move in a predetermined direction, in this case "Z"

Unfortunately, piezoelectric tubes and other types of actuators are imperfect. For example, the piezo tube often does not move only in the intended direction. FIG. 1D shows an undesirable, yet common, case where a piezo tube actuator 18 was commanded to move in the Z-direction (by the application of an appropriate voltage between the inner and outer electrodes, 29 in FIG. 1C), but where, in response, the Z tube 18 moves not only in the Z direction, but in the X and/or Y directions as well. This unwanted parasitic motion, shown in FIG. 1D as ΔX (not to scale), limits the accuracy of measurements obtained by scanning probe microscopes. Similar parasitic motion in the Y direction is also common. The amount of this parasitic motion varies with the geometry of the tube and with the uniformity of the tube material, but typically cannot be eliminated to the accuracy required by present instruments.

Current methods of monitoring the motion of the probe or sample 20 when driven by a piezoelectric tube in either the arrangement of FIG. 1A or FIG. 1B are not sufficiently developed to compensate for this parasitic X and Y error. The devices are typically calibrated by applying a voltage to the X-Y tube and the Z tube, and then measuring the actual distance that the sample or probe travels. Thus, the position of the piezo tube is estimated by the voltage that is applied to the X-Y tube and the Z tube. However, because the (X,Y) position error introduced by the Z tube on the probe (or on the sample for the arrangement shown in FIG. 1B) is essentially random, it cannot be eliminated merely by measuring the voltage applied to the Z tube or to the X-Y tube.

Moreover, with respect to movement in the intended direction, piezoelectric tubes and other types of actuators typically do not move in a predictable way when known voltages are applied. The ideal behavior would be that the actuator move in exact proportion to the voltage applied. Instead actuators, including piezo tubes, move in a non-linear manner, meaning that their sensitivity (e.g., nanometers of motion per applied voltage) can vary as the voltage increases. In addition, they suffer from hysteresis effects. Most generally, the response to an incremental voltage change will depend on the history of previous voltages applied to the actuator. This hysteresis effect, thus, can cause a large prior motion to affect the response of a commanded move, even many minutes later.

Additionally, vertical measurements in scanning probe microscopy are typically calculated mathematically by recording the voltage applied to the piezoelectric tube and then multiplying by the tube's calibrated sensitivity in nm/V. But as mentioned previously, this sensitivity is not constant and depends on the previous voltages applied to the tube. So using the voltage applied to the tube to calculate the vertical motion of the tube will always result in an error with respect to the actual motion. This error can translate directly into errors when measuring surface topography of a sample and performing other metrology experiments. These issues have been addressed specifically for the case in which the probe assembly of the AFM is coupled to the actuator (i.e., the case in which the probe assembly moves in three orthogonal directions, for example, in the cases cross-referenced above).

What is needed, therefore, is an apparatus and method for accurately measuring and controlling the motion of the sample or probe by minimizing adverse parasitic motion introduced by an actuator (e.g., a Z tube) in a metrology apparatus where the sample is scanned. In particular, if the adverse parasitic motion is minimized, the intended motion of the sample or probe will be realized and the apparatus will accurately measure and track the actual motion of the sample or probe in the X and/or Y directions in response to voltages applied to an XY actuator.

SUMMARY OF THE INVENTION

The present invention is directed to an apparatus and method for isolating vertical or Z-motion of a SPM actuator and measuring the motion of a sample coupled to the actuator in a direction generally perpendicular to a longitudinal axis of an elongate actuator (e.g., movement in the XY plane). The apparatus implements an optical detection apparatus including an objective (e.g., a set of microlenses) mounted to a reference structure coupled to the actuator, wherein the reference structure minimizes negative effects associated with parasitic motion introduced, for example, by the actuator (e.g., a Z tube) in a metrology apparatus such as an AFM or a profiler. A light beam is generated by a light source and directed through the objective and towards a position sensor that detects changes in the direction of the beam indicative of actual movement of a sample in response to voltage signals applied to an XY actuator. This rigid mechanical structure that includes a fixed probe that scans a sample by translating the sample via the actuator to which it is mounted results in higher resolution than a moving probe scanning a fixed sample and thus is particularly adapted for research applications.

According to a first aspect of the preferred embodiment, an assembly for a metrology apparatus includes an actuator with a longitudinal axis having a fixed end and a free end configured to be translated in, preferably, three orthogonal directions with respect to the fixed end. A multiple bar linkage having first and second links mutually constrained to translate with respect to each other, the first link being fixed to a reference structure and the second link being constrained to translate in a direction generally parallel to the longitudinal axis of the actuator. A sample holder is supported by a multiple bar linkage. A coupling has first and second opposed ends with the first end fixed to the actuator proximate its free end, and the second end fixed to the second link. The coupling is adapted to transmit displacement in a direction substantially parallel to the longitudinal axis of the actuator.

According to another aspect of this embodiment, the actuator has a z-axis translating section and an x and y-axis translating section which is disposed between the fixed end of the apparatus and the z-axis translating section. The reference structure is mechanically independent from translation of the z-axis translating section but is mechanically responsive to the x and y-axis translating section.

According to yet another aspect of this embodiment, the reference structure is fixed to the multiple bar linkage to deflect the multiple bar linkage in the X and Y directions in response to X and Y deflections of the x and y-axis translating stage. The multiple bar linkage further includes a first mirror fixed to a least one of the links of the multiple bar linkage, and a second mirror fixed to another of the links of the multiple bar linkage.

In another aspect of the preferred embodiment, an assembly for a metrology apparatus has a probe assembly that includes an elongate actuator with a longitudinal axis, the actuator having a first end configured to be coupled to a frame of the microscope and a free end configured to be coupled to a sample holder. The elongate actuator provides controllable translation in, preferably, three orthogonal directions upon application of proper electrical stimuli.

A method of reducing positioning errors at the free end of the elongate actuator includes the steps of fixing the probe assembly to the frame, and supporting the sample holder with a reference structure of the metrology apparatus, the reference structure being substantially insensitive to longitudinal expansion or contraction of the elongate actuator. The method also includes isolating the reference structure from a longitudinal tube deflection of the elongate actuator and driving a first portion of the elongate actuator so as to simultaneously generate both longitudinal deflections and lateral deflections in the first portion. In this method, the system prevents the lateral deflections generated in the longitudinally expanding and contracting portion of the tube from laterally deflecting the sample holder while simultaneously transmitting the longitudinal deflections to the sample holder.

In another aspect of this preferred embodiment, a second portion of the elongate actuator is configured to provide translation in a plane substantially perpendicular to the longitudinal direction. As such, the method includes driving the second portion of the elongate actuator and generating lateral deflections in the second portion as a result of the driving of the second portion step. Moreover, the method includes transmitting the lateral deflections in the second portion to the sample holder.

Another preferred embodiment of the present invention is directed to a scanning probe microscope assembly including a microscope frame and a piezoelectric actuator having a first end fixed to the frame and a second free end supporting a sample. A first reflector assembly is fixed proximate to the free end of the piezoelectric actuator. A first electromagnetic radiation source fixed with respect to the frame is disposed to direct radiation onto the first reflector assembly. The first electromagnetic radiation detector is disposed to receive light from the first source after it has been received and reflected by the first reflector assembly and to generate a signal indicative of a degree of longitudinal deflection of the piezoelectric actuator.

According to a still further aspect of the preferred embodiment, an optical apparatus for measuring movement of an actuator in a metrology apparatus includes a sample holder coupled to the actuator, an optical measuring device including a light source that generates a light beam, the device being configured to change the direction of the beam in response to movement of the actuator. The system also includes a sensor to detect the beam and generate a signal indicative of the movement of the actuator.

According to yet another aspect of the preferred embodiment of the present invention, a method for measuring movement of an actuator in a metrology apparatus includes providing a movable bar assembly coupled to the actuator and to a reference structure, and supporting a sample holder with the movable bar assembly. The method measures movement of the movable bar assembly in operation.

In another aspect of the preferred embodiment, a reference assembly is employed to generally decouple movement of the apparatus, in a direction other than the intended direction, from the sample. The reference assembly includes a reference structure and a sample holder coupled to the reference structure and to the actuator. The sample is attached to the sample holder. A flexible bar having opposed ends, a first of which is coupled to the actuator and the other of which is coupled to the sample holder. The flexible bar, reference structure and flexure are adapted to collectively decouple movement of the microscope, in the direction other than the intended direction, from the probe.

According to a further aspect of the preferred embodiment, a metrology apparatus for analyzing a sample includes an actuator which includes a first actuator stage configured to controllably move in first and second orthogonal directions. A second actuator stage preferably is disposed adjacent to the first actuator stage and is configured to controllably move in a third direction orthogonal to the first and second orthogonal directions. A reference structure having first and second ends is fixed relative to movement of the second actuator stage. A coupling coupled to the second actuator stage and to a multi-bar linkage assembly is fixed to the second end of the reference structure. The second actuator stage and the coupling are configured to move the linkage in the third orthogonal direction in a manner that substantially isolates the linkage from any second actuator stage motion in the first and second directions. An objective fixed to the second end of the reference structure is between a light source and a position sensor. The position sensor measures the first actuator stage motion in the first and second directions. In this embodiment, the multi-bar linkage supports the sample.

These and other objects, features, and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which.

DETAILED DESCRIPTION OF THE PREFERRED EMBODIMENTS

Figure 2:
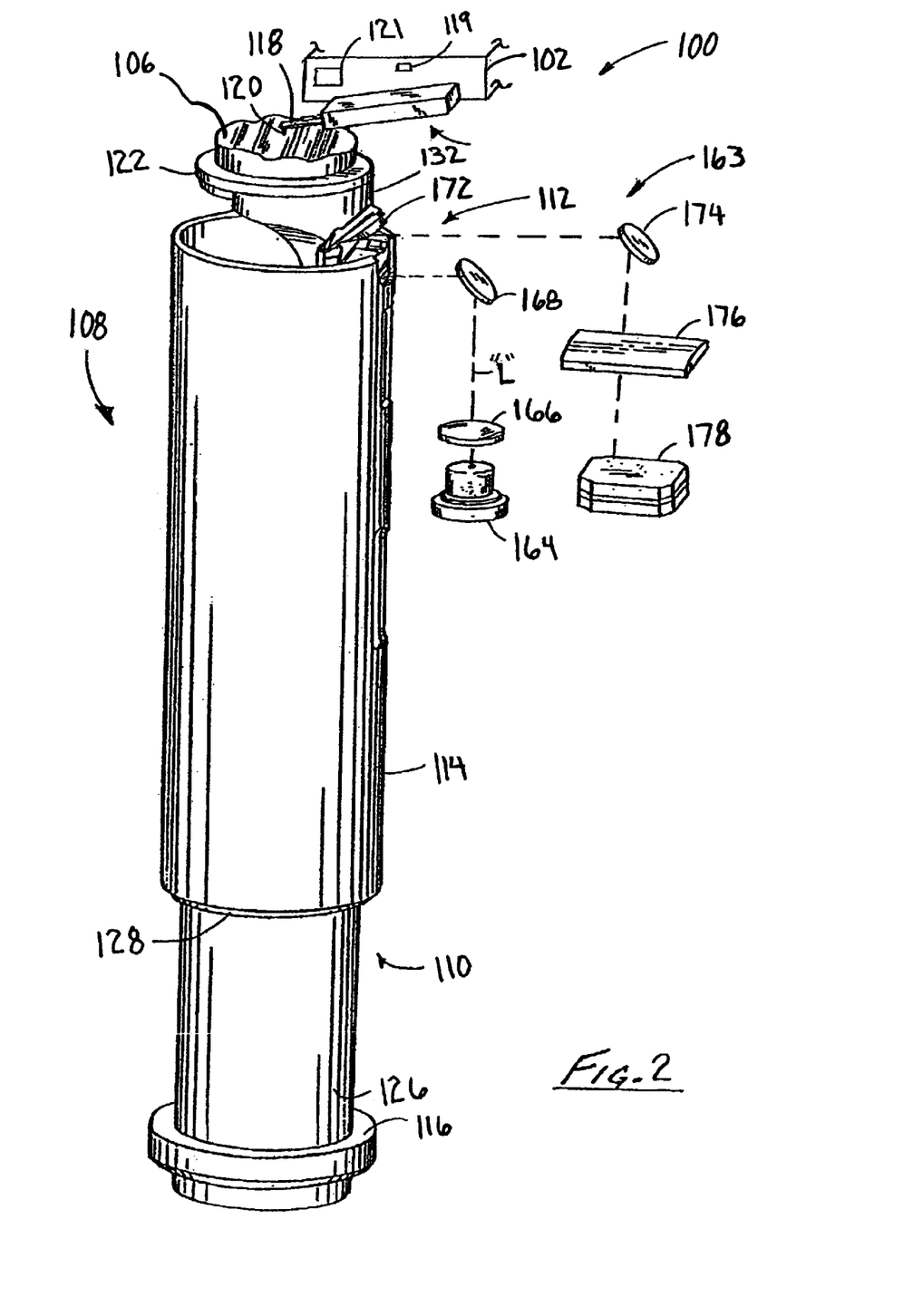
FIG. 2 is a perspective assembly view of a scanning probe microscope and apparatus for measuring motion in the Z direction according to the preferred embodiment.

Referring initially to FIG. 2, a scanning probe microscope (SPM) 100 is shown. The microscope includes a chassis including a support 102 to which a probe assembly 104 is attached. Probe assembly 104 is configured to interact with a sample 106. More particularly, probe assembly 104 is kept stationary while sample 106 is translated, preferably in raster scan fashion, relative thereto to image or otherwise collect data pertaining to the sample. An actuator assembly 108 includes an actuator 110 for translating the sample 106, and a reference assembly 112 defining, among other structure, an elongate reference structure 114 that surrounds actuator 110. Reference structure 114 is tubular and has a longitudinal axis that is generally collinear with the longitudinal axis of actuator 110. Actuator 110 is preferably piezoelectric or electrostrictive, and may be a tube actuator or another type of actuator conventional in the art of nanopositioning systems. Actuator 110 is fixed to a mount 116 which is also coupled to the chassis of the microscope.

Probe assembly 104 is fixed to support 102 and includes a cantilever 118 having a stylus (i.e., tip) 120 either attached thereto or formed integrally therewith. During operation, the surface of sample 106 is scanned beneath fixed stylus 120 to determine characteristics (for example, surface topography) of sample 106. The scanning operation is provided by actuator 110, which is driven by program-controlled signals (e.g., appropriate voltages) to cause the actuator 110 to move laterally in two dimensions, as well as to extend and retract in this embodiment. This movement of the actuator is transmitted to sample 106 which is mounted on a sample mount 122 that translates in conjunction with actuator 110. For example, actuator 110 can move sample 106 toward or away from tip 120 in a vertical direction in response to closed loop signals derived from a sensor 121 (as shown in FIG. 4), in conventional fashion as described below.

Figure 3:
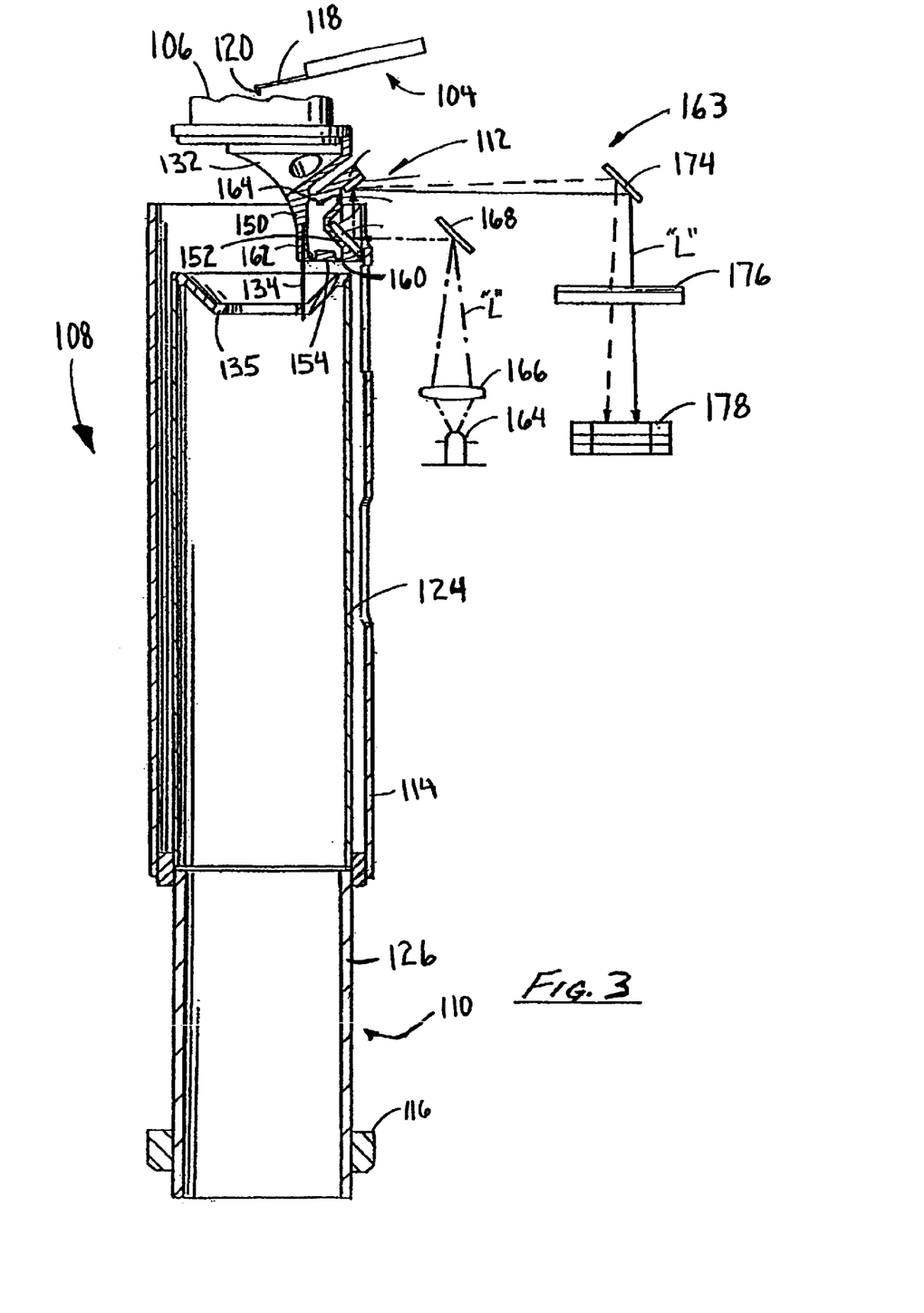
FIG. 3 is a front cross-sectional view of the scanning probe microscope of FIG. 2.
Figure 4:
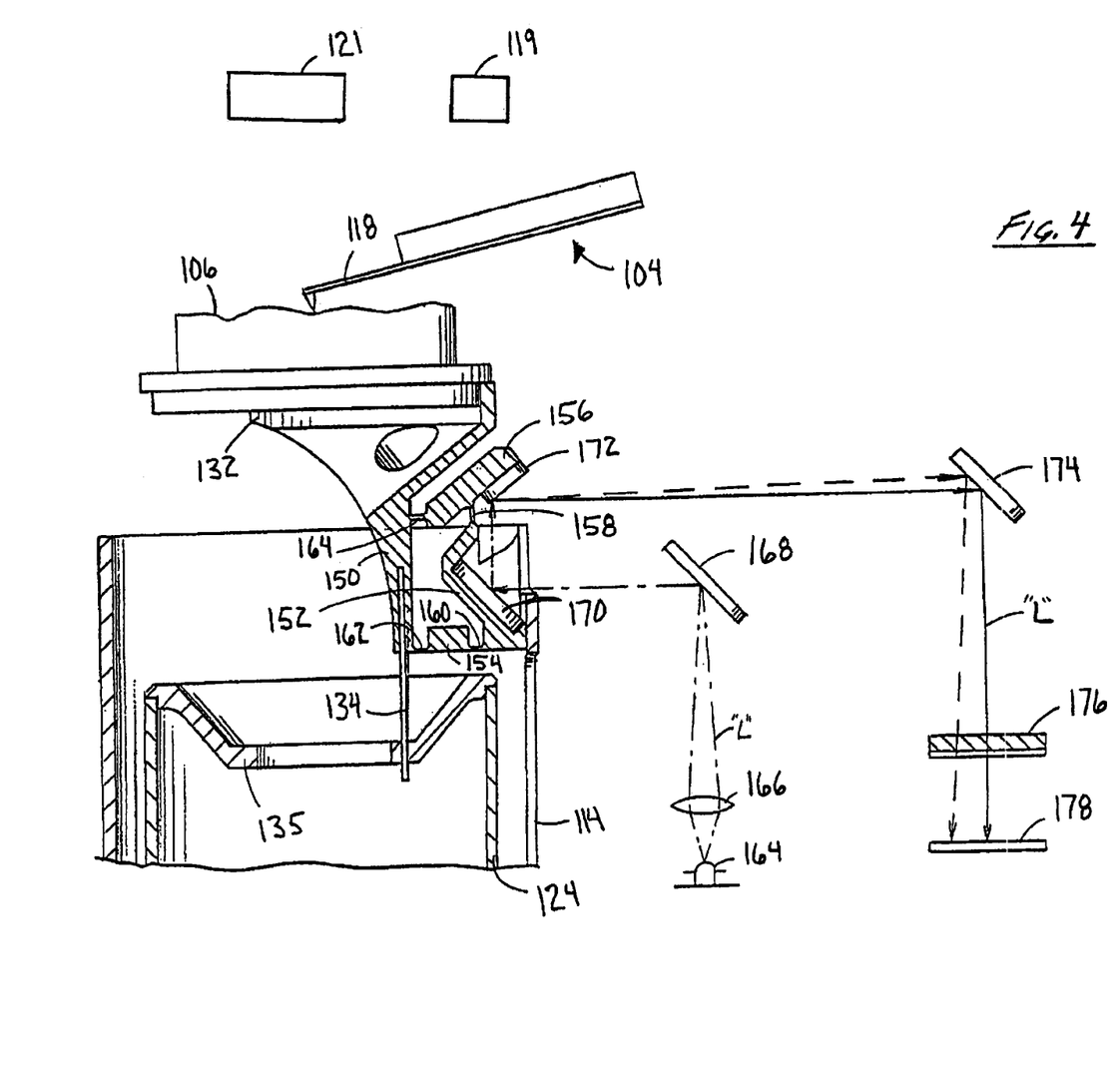
FIG. 4 is a partial broken away cross-sectional view of the scanning probe microscope shown in FIG. 2.

In this regard, referring to FIGS. 2, 3 and 4, an electromagnetic radiation source 119 (e.g., a laser) is fixed to support 102. In operation, source 119 directs light towards a backside of cantilever 118 of probe assembly 104. Detector 121 receives the light reflected from the probe, and in turn, generates a corresponding signal. In this fashion, deflection of cantilever 118 as tip 120 interacts with the scanning sample surface 106 can be monitored. Again, the signals generated by the deflection of cantilever are used in a closed loop feedback configuration to control actuator 110, and more particularly, to control the separation between tip 120 and sample surface 106, thus providing information about the sample surface. Note that we refer hereinafter to the extending and retracting of sample 106 toward and away from tip 120 as motion in the Z direction, and translation of sample 106 laterally relative to tip 120 as motion in the X direction and the Y direction, where the X and the Y axes are orthogonal to each other and define a plane substantially parallel to the surface of sample 106. This nomenclature is used purely for convenience to indicate three orthogonal directions.

As noted, actuator 110 preferably translates sample 106 in three orthogonal directions under program control. This is preferably implemented as shown in the Figures where actuator 110 includes an X-Y tube section 126 coupled to the chassis and a Z tube section 124 coupled to X-Y tube 126. Z tube section 124 has a free end coupled to sample 106, preferably positioned on top of X-Y tube 126 to maximize the range of X-Y motion provided by X-Y tube 126. As illustrated in FIG. 2, the two tube sections 124, 126 of piezoelectric actuator 110 are coupled together end-to-end proximate to circular collar 128 that extends around and is affixed to the actuator sections.

Minimizing the Effect of Parasitic Movement of the Sample

Next, to illustrate one aspect of the preferred embodiment, we turn to FIGS. 2–4 which show an apparatus for ensuring that displacements generated by actuator 110 and transferred to the scanned sample 106 coupled thereto are isolated from movement of actuator 110 in a direction other than the intended direction of the actuator; in other words, the preferred embodiment operates so that intended displacements of the actuator are, in the best case, completely isolated from parasitic movement of actuator 110. In this regard, actuator 110 is coupled to a movement isolating device 132 such as a flexure via a flexible bar or element 134 (i.e., a coupling) that is adapted to transmit displacement only in an intended direction. As a result, adverse effects associated with non-intended movement of the metrology apparatus 100, such as parasitic movement of actuator 110 are minimized, as described in further detail below.

In FIGS. 2 and 3, for example, a mount 135 attached to Z tube section 124 of actuator 110 is coupled to flexure 132 with flexible bar coupling 134. In this case, coupling 134 is configured so as to transmit displacement generated by actuator 110 (and particularly Z tube 124 of actuator 110) in the Z or vertical direction, but generally not displacement of Z tube 124 in the X and Y directions.

To realize this minimization of parasitic movement of actuator 110, flexure 132 is also coupled to fixed reference structure 114. Flexure 132 is preferably a parallelogram flexure comprising a four-bar linkage that is adapted to translate so that its opposed vertical links 150, 152 and 154, 156 remain generally orthogonal to the X-Y plane in response to a force, and therefore displacement, transmitted in the vertical or Z direction by bar 134. This movement of flexure 132 is rotational about points 158, 160, 162, 164 thereof.

To ensure that the opposed vertical links of flexure 132 move in this fashion, flexible element 134 is configured so as to be sufficiently rigid to transmit vertical displacement of actuator 110, but flexible enough to decouple, for example, parasitic X-Y movement of Z tube 124 (see FIG. 1D) from flexure 132. Flexible element 134 may be on the order of 3 mm long and 0.2 mm in diameter, for instance. Sample 106 and more particularly sample holder 122 is coupled to link 156 of flexure 132. As a result, sample 106 mounted within SPM 100 moves substantially only in the intended direction in response to activation of actuator 110 (in this case, Z), thus causing "Z" movement of sample relative to reference structure 114. On the other hand, because, in the preferred embodiment, reference structure 114 is coupled to X-Y tube 126, reference structure 114 moves in conjunction therewith, thus transmitting this intended X-Y motion to flexure 132. As a result, sample 106 can move in the X and Y directions freely upon activation of X-Y tube section 126.

With more specific reference to FIGS. 2–4, a second source 164 of electro-magnetic radiation (e.g., a laser) which is part of an optical measuring device 163 is used in an apparatus to measure Z-movement of section 124. Source 164 is mounted so as to direct a beam of light "L" generally vertically (i.e., orthogonal to the sample surface) through focusing lens 166 and on to a mirror 168 of optical measuring device 103. Mirror 168 directs the beam towards the multi-bar linkage, also referred to as flexure 132 which, again, is mounted on reference structure 114, and which supports sample 106. A reflecting surface, such as a mirror 170 is mounted on one of the links 152 of flexure 132 and directs the beam towards the second mirror 172 in a corner-cube arrangement such that flexure 132 comprises part of optical measuring device 163 on another of the links of flexure 132 which thereafter directs the beam towards yet another reflecting surface 174. Reflecting surface 174 (e.g., a mirror) then directs the reflected beam towards a detector 178 to measure the movement of the sample in the vertical, or Z, direction. Again, because the flexible bar 134 only transmits forces in the vertical direction, parasitic movement of the Z section 124 of actuator 110 is not transmitted to flexure 132 and thus such movement does not affect movement measured by the optical measuring device 163. Preferably, a cylindrical lens 176 is disposed intermediate mirror 174 and detector 178 (or it can be located at any point between laser 119 and detector 178 as desired) to maintain sufficient signal and thus enhance precision.

To monitor, for example, topographical changes on the surface of sample 106, appropriate feedback depending on the mode of AFM operation is provided. This is preferably implemented via an optical beam-bounce technique, as described previously. Electromagnetic radiation source 119 generates light (e.g., laser light) that is directed onto the back of cantilever 118, or a mirror attached thereto to direct the radiation toward detector 121. Detector 121 generates an appropriate signal that is provided to a feedback loop that generates a control signal that is used to manipulate tip-sample separation. In this arrangement, the control signals are indicative of sample characteristics.

Optical Sensing of Actuator Movement in XY Plane

Figure 5:
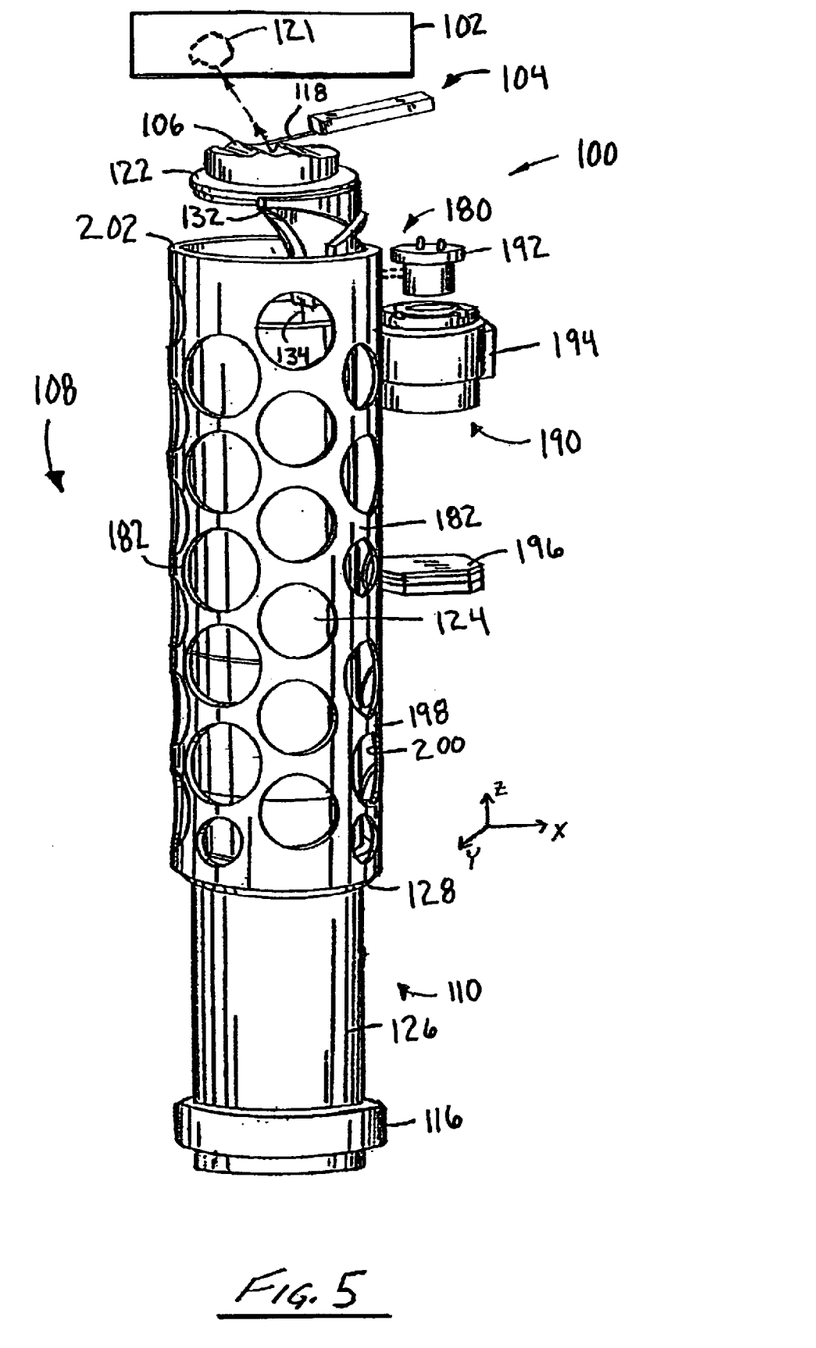
FIG. 5 is a side elevational view of a scanning probe microscope assembly according to the present invention.
Figure 6:
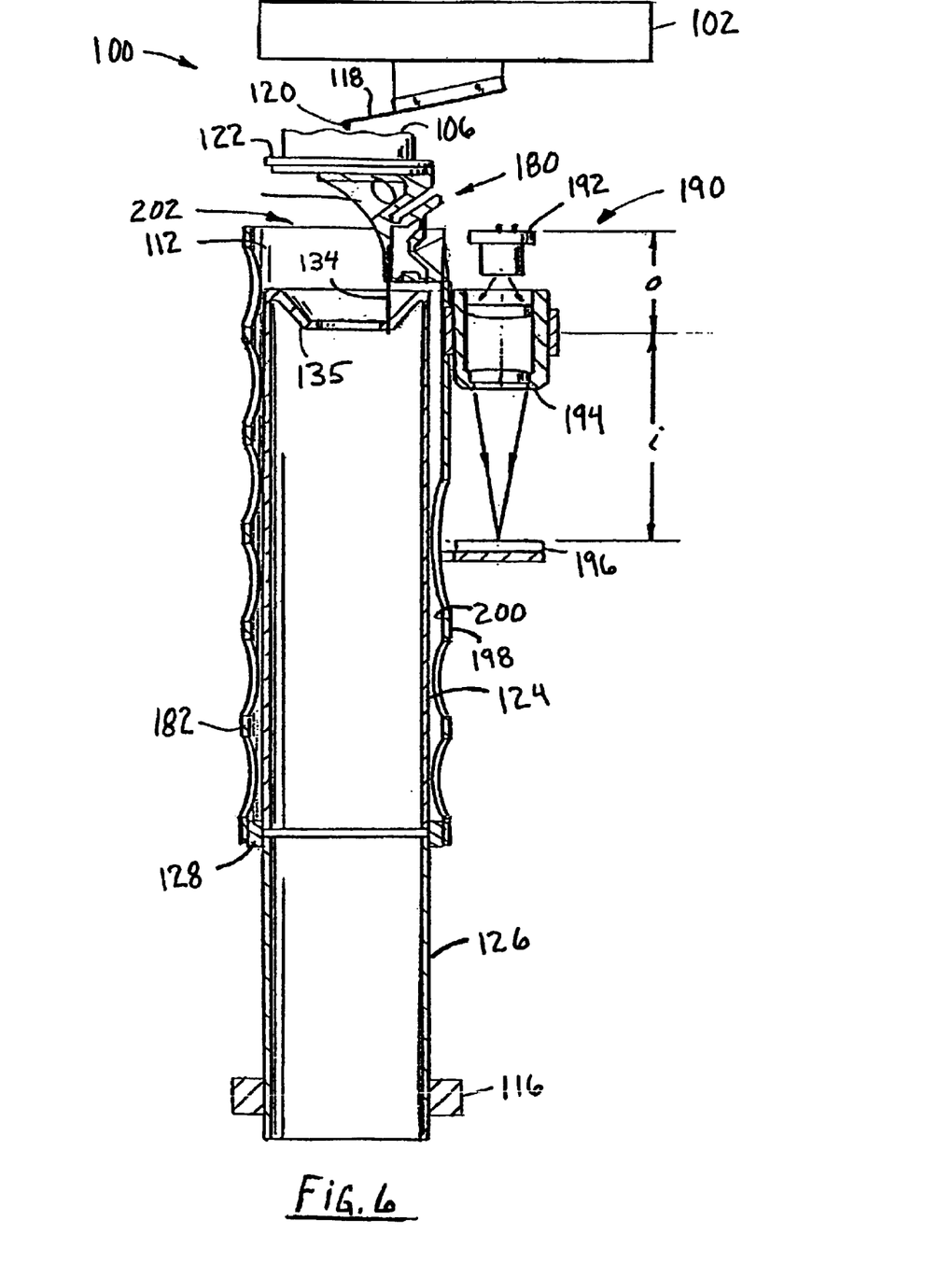
FIG. 6 is a side cross-sectional view of a scanning probe microscope assembly of FIG. 5.

The actuator assembly including another optical measuring apparatus 190 for measuring lateral, or X-Y, movement of the sample coupled to actuator 110 is shown in more detail in FIGS. 5 and 6. Again, actuator assembly includes actuator 110 (preferably a piezoelectric tube) and a reference assembly 180 which comprises a reference structure 182, a coupling mount 135, flexible bar coupling 134, flexure 132, and sample holder 122, as described in detail below.

Again, in the preferred embodiment of the present invention, actuator 110 is formed of two sections; first, a lower section 126 is configured to deflect laterally in a plane perpendicular to the central axis of actuator 110 under program control. For this reason, as noted earlier, this section is known as the X-Y tube. Actuator 110 also includes an upper Z tube actuator 124 that is adapted to extend or contract in a direction substantially parallel to the longitudinal axis of actuator 110 under program control. Note that a discussion of an apparatus for controlling such actuators can be found, for example, in U.S. Pat. No. 6,008,489, and other related applications.

The two tube sections 124, 126 of piezoelectric actuator 110 are coupled together end-to-end proximate to a circular collar 128 that extends around and is affixed to the actuator sections. Actuator assembly 110 is preferably coupled to support 102 at its lower end, for example, using collar mount 116 shown in FIGS. 5 and 6. In this embodiment, elongate reference structure 182 of reference assembly 180 extends around at least the Z tube 124 of actuator 110, and is fixed to the collar 128. Collar 128, in turn, is fixed to actuator 110 at or near the junction of the upper and lower actuator sections 124, 126. When X-Y tube is driven under program control, it deflects in a direction generally perpendicular to the longitudinal axis of actuator 110. Because collar 128, and reference structure 182 are fixed to the actuator near the top of the X-Y tube, they also deflect laterally. Again, the X-Y tube is preferably placed furthest from the structure it is translating (in this case sample holder 122 and sample 106) so as to maximize X-Y range of motion (i.e., scanning).

On the other hand, when Z tube 124 is driven under program control, it does not expand or retract collar 128, the fixed end of Z-tube coupled thereto. Therefore, the reference structure does not expand or retract since it is coupled to collar 128. In other words, when Z tube 124 extends or retracts, it extends or retracts relative to structure 182 which causes a substantial change in the relative position of the two at the upper (or free) end of Z tube 124, as highlighted previously.

In the operation of this embodiment, an optical measuring apparatus 190 measures movement of sample 106 in the X and/or Y directions (e.g., the XY plane) in response to voltage signals applied to X-Y actuator 126. Optical measuring apparatus 190 includes a light source 192, an objective 194 fixed to reference structure 182, and a position sensor 196. Movement of objective 194 depends on movement of reference structure 182, while light source 192 and position sensor 196 are stationary. Objective 194 is preferably located between light source 192 and position sensor 196. Alternatively, light source 192 may be coupled to reference structure 182, while objective 196 is stationary.

Flexure 132 and reference structure 182 provide a rigid mechanical connection in the XY plane between sample 106 and X-Y actuator 126, therefore minimizing any X-Y error (parasitic X-Y motion, etc.) introduced by Z tube 124 in the XY plane. Movement of reference structure 182 is thus indicative of accurate movement of sample 106 in the XY plane in response to voltage signals applied to X-Y actuator 126. Likewise, movement of objective 194 mounted to reference structure 182 corresponds to movement of sample 106 in the XY plane.

With objective 194, optical measuring apparatus 190 provides optical magnification between light source 192 and position sensor 196. In operation, X-Y actuator 126 is actuated in response to voltage signals and moves in a particular direction (e.g., in the X and/or Y directions), thereby causing reference structure 182 and corresponding objective 194 to move. Measuring the position at which a beam of electromagnetic radiation from light source 192 contacts position sensor 196 through objective 194 provides an indication of the movement of sample 106 as position sensor 196 and light source 192 are both fixed. In particular, the magnification provided by objective 194 is based on:

$$M=1+i/o \qquad \text{Eqn. 1}$$

where "i" is the orthogonal distance from objective 194 to position sensor 196, and "o" is the orthogonal distance from objective 194 to light source 192. Objective 194 provides optical magnification to increase the signal-to-noise ratio by multiplying the signal by a factor of M (e.g., if M=5, for every micron that objective 194 moves in the X and/or Y directions, the light beam moves across position sensor 196 by five microns, thereby increasing the signal-to-noise ratio by a factor of 5).

Objective 194 further comprises a set of separate microlenses (e.g., four) that is fixed to an outside surface 198 of reference structure 182 opposite an inside surface 200 adjacent to actuator assembly 110. Objective 194 does not focus the light beam to a point, but rather defocuses by integrating the light beam over a particular area. If, on the other hand, objective 194 focused the light beam to a point, surface asperities would become magnified, thereby introducing large distortions.

Position sensor 196 is an XY position sensor (e.g., a lateral effect photodiode) configured to detect the direction of the light beam and generate a displacement signal indicative of movement of sample 106 in response to voltage signals applied to X-Y actuator 126 (e.g., in a direction generally perpendicular to the longitudinal axis of actuator 126).

AFM operation is as described previously. Again, to determine the height of various features at different locations on the sample surface, sample 106 is scanned so as to interact with stylus 120 in a regular raster pattern in XY, while sample 106 is also moved in Z by Z actuator 124. In operation, to direct sample 106 laterally, an electrical signal is applied to X-Y tube 126, which in turn causes an upper portion 202 of actuator assembly 110 to deflect in relation to stylus 120. Depending upon the signals applied to X-Y tube 126, this can cause sample 106 to move in two orthogonal directions relative to stylus 120.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept. For example, instead of coupling objective 194 to reference structure 182, either light source 192 or position sensor 196 could be fixed to reference structure 182. Note also that "couple," "coupling," etc. are used throughout to indicate a connection between two structures but that the connection does not necessarily have to be direct, it can be via another structure. The scope of still other changes to the described embodiments that fall within the present invention but that are not specifically discussed above will become apparent from the appended claims.

What is claimed is:

1. An assembly comprising:
    an actuator with a longitudinal axis having a fixed end, and a free end configured to translate in three orthogonal directions with respect to said fixed end;
    a multiple bar linkage having first and second links mutually constrained to translate with respect to each other, and wherein said first link is fixed to a reference structure and said second link is constrained to translate in a direction generally parallel to the longitudinal axis of said actuator;
    a sample holder supported by said linkage; and
    a coupling having first and second ends, said first end being fixed to said actuator proximate to its free end, and said second end being fixed to said second link, the coupling adapted to transmit displacement in a direction substantially parallel to the longitudinal axis of said actuator.

2. The assembly of claim 1, wherein said actuator has a z-axis translating section, and an x and y-axis translating section disposed between said fixed end and said z-axis translating section.

3. The assembly of claim 2, wherein said reference structure is mechanically independent from translation of said z-axis translating section, but mechanically responsive to said x and y-axis translating section.

4. The assembly of claim 3, wherein said reference structure is fixed to said multiple bar linkage to deflect said multiple bar linkage in X and Y directions in response to X and Y deflections of said x and y-axis translating stage.

5. The assembly of claim 4, wherein said multiple bar linkage further includes a first mirror fixed to at least one of said links of the multiple bar linkage, and a second mirror fixed to another of said links of said multiple bar linkage.

6. The assembly of claim 5, wherein the assembly is adapted to be supported in a chassis, and further wherein said first mirror is disposed in the path of a light beam from a light source mounted on said chassis and is disposed to reflect the light toward said second mirror.

7. The assembly of claim 1, wherein the assembly is a scanning probe microscope.

8. The assembly of claim 1, wherein said actuator is a piezoelectric actuator.

9. In an assembly for a metrology apparatus having a probe assembly, the assembly including an elongate actuator with a longitudinal axis and having a first end configured to be coupled to a frame of the microscope and a free end configured to be coupled to a sample holder, wherein the elongate actuator is configured to provide controllable translation in three orthogonal directions upon application of proper electrical stimuli, a method of reducing positioning errors at the free end of the elongate actuator comprising the steps of:

fixing the probe assembly to the frame;
supporting the sample holder with a reference structure of the metrology apparatus, the reference structure being substantially insensitive to longitudinal expansion or contraction of a first portion of the elongate actuator;
isolating the reference structure from a longitudinal deflection of the first portion of the elongate actuator;
driving the first portion of the elongate actuator;
simultaneously generating both longitudinal deflections as well as lateral deflections in the first portion as a result of said driving step; and
preventing the lateral deflections generated in the first portion of the elongate actuator from laterally deflecting the sample holder while simultaneously transmitting the longitudinal deflections to the sample holder.

10. The method of claim 9, wherein a second portion of the actuator is configured to provide translation in a plane substantially perpendicular to the longitudinal direction, and wherein the method further includes the steps of:

driving the second portion of the actuator;
generating lateral deflections in the second portion as a result of said driving the second portion step; and
transmitting the lateral deflections in the second portion to the sample holder.

11. A scanning probe microscope assembly, comprising:
a microscope frame;
a piezoelectric actuator having a first end fixed to said frame and a second free end coupled to a sample holder via multiple bar linkage that facilitates moving said sample holder substantially only in an intended direction of motion of said actuator;
a first reflector assembly fixed proximate to said free end of said piezoelectric actuator;
a first electromagnetic radiation source fixed with respect to said frame and disposed to direct radiation onto said first reflector assembly; and
a first electromagnetic radiation detector disposed to receive light from said first source after it has been received and reflected by said first reflector assembly and to generate a signal indicative of a degree of longitudinal deflection of said piezoelectric actuator.

12. The scanning probe microscope assembly of claim 11, further comprising a cantilevered probe having a free end and a fixed end and coupled at its fixed end to said frame, said probe including a second reflector disposed to translate with said probe when said probe is deflected with respect to said piezoelectric actuator.

13. The scanning probe microscope assembly of claim 12, further comprising a second electromagnetic radiation detector disposed to receive light reflected from said second reflector and to generate a signal indicative of a degree of deflection of said free end of said probe with respect to said fixed end of the probe.

14. An apparatus for measuring movement of an actuator in a metrology apparatus, the measuring apparatus comprising:

a sample holder coupled to the actuator;
an optical measuring device including a light source that generates a light beam, said measuring device being configured to change the direction of said beam in response to movement of the actuator;
sensor to detect said beam and generate a signal indicative of the movement of the actuator; and
wherein said measuring device includes a movable bar assembly coupled to the actuator and to a reference structure, wherein said bar assembly has a reflecting surface that is adapted to deflect said beam, and wherein said bar assembly is responsive to movement of the actuator so as to change the direction of said deflected beam.

15. The apparatus of claim 14, wherein said bar assembly includes a first link having a first end coupled to the actuator, and a second link defining said reflecting surface and having a first opposed end rotatably coupled to said first link and a second opposed end rotatably attached to said reference structure.

16. The apparatus of claim 14, wherein said reference structure is tubular and generally surrounds the actuator.

17. The apparatus of claim 16, wherein said reference structure is configured to allow said light beam to pass therethrough.

18. The apparatus of claim 14, wherein said bar assembly includes a link having opposed ends, a first opposed end rotatably coupled to the actuator and a second opposed end rotatably coupled to said reference structure.

19. The apparatus of claim 14, wherein said bar assembly comprises a four bar linkage including first and second reflecting surfaces, said surfaces disposed to reflect light such that the incoming and outgoing beams are generally parallel.

20. The apparatus of clam 14, said optical measuring device includes a lens disposed intermediate said light source and said sensor.

21. The apparatus of claim 20, wherein said lens has a magnification equal to 1+i/o, wherein "i" equals the orthogonal distance between said lens and said sensor, and "o" equals the orthogonal distance between said lens and said light source.

22. The apparatus of claim 20, wherein said light source is coupled to the actuator.

23. The apparatus of claim 22, wherein said lens has a magnification equal to i/o, wherein "i" equals the orthogonal distance between said lens and said sensor, and "o" equals the orthogonal distance between said lens and said light source.

24. A method for measuring movement of an activator in a metrology apparatus, the method comprising:

providing a movable bar assembly coupled to the actuator and to a reference structure;
supporting a sample holder with the movable bar assembly; and
measuring, in response to movement of the actuator, movement of said movable bar assembly, wherein the movement of said movable bar assembly is indicative of movement of the actuator.

25. The method of claim 24, wherein said movable bar assembly includes a first link having a first end coupled to the actuator, and a second link defining a reflecting surface and having a first opposed end rotatably coupled to said first link and a second opposed end rotatably attached to said reference structure.

26. In a metrology apparatus having an actuator for moving a sample in a particular direction, a reference assembly that generally decouples movement of the apparatus in a direction other than the particular direction from the sample, the reference assembly comprising:
   a reference structure;
   a sample holder coupled to said reference structure and to the actuator, the sample being attached to said sample holder; and
   a flexible bar having opposed ends, one of which is coupled to the actuator and the other of which is coupled to said sample holder via a movement isolating device, wherein said flexible bar and said reference structure, are adapted to collectively decouple movement of the actuator in the direction other than the particular direction from the sample.

27. The apparatus of claim 26, wherein said reference structure is a tubular frame and has a longitudinal axis that is generally collinear with a longitudinal axis of the actuator.

28. The apparatus of claim 26, wherein said flexible bar is more flexible in response to displacements applied thereto in any direction other than the particular direction.

29. The apparatus according to claim 28, wherein the particular direction is the Z direction.

30. The apparatus according to claim 26, wherein said movement isolating device is a parallelogram flexure.

31. The apparatus of claim 30, comprising a probe structure assembly comprising a four bar linkage having four joints.

32. The apparatus of claim 26, wherein said movement isolating device is a flexible disc, said flexible disc being attached to said reference structure generally around a perimeter of said flexible disc.

33. A metrology apparatus for analyzing a sample the assembly comprising:
   an actuator including a first actuator stage configured to controllably move in first and second orthogonal directions, and a second actuator stage adjacent to the first actuator stage and configured to controllably move in a third direction orthogonal to the first and second orthogonal directions;
   a reference structure having first and second ends wherein the first end is fixed relative to movement of the second actuator stage;
   a coupling coupled to the second actuator stage and to a multi-bar linkage assembly fixed to the second end of the reference structure, wherein the second actuator stage and the coupling are configured to move the linkage in the third orthogonal direction in a manner that substantially isolates the linkage from any second actuator stage motion in the first and second directions;
   an objective fixed to the reference structure, wherein the objective is between a light source and a position sensor, and the position sensor measures first actuator stage motion in the first and second directions; and
   wherein the multi-bar linkage supports the sample.

34. The assembly of claim 33, wherein first actuator stage motion in the first and second directions is coupled to the reference structure.

35. The assembly of claim 34, wherein motion of the reference structure in the first and second directions is translated to the objective.

36. The assembly of claim 35, wherein the light source and the position sensor are stationary.

37. The assembly of claim 33, wherein the position sensor is a lateral effect photodiode.

38. The assembly of claim 33, wherein the objective further comprises a set of microlenses.

39. The assembly of claim 38, wherein the set of microlenses provide optical magnification to increase a signal-to-noise ratio.

40. The assembly of claim 39, wherein the magnification is $$M=1+i/o$$

wherein i is an orthogonal distance from the set of microlenses to the position sensor and o is an orthogonal distance from the set of microlenses to the light source.

41. The assembly of claim 33, wherein the reference structure and the coupling provide a rigid mechanical connection between the first actuator stage and the sample in the first and second directions.

42. The assembly of claim 33, wherein the reference structure further comprises an inside surface adjacent to the actuator and an outside surface.

43. The assembly of claim 42, wherein the objective is mounted on the outside surface of the reference structure.

44. An assembly comprising:
   an actuator with a longitudinal axis having a fixed end and a free end configured to translate a sample coupled thereto in three orthogonal directions with respect to the fixed end;
   a multiple bar linkage having first and second links mutually constrained to translate with respect to each other, and wherein the first link is fixed to a reference structure and the second link is constrained to translate in a direction generally parallel to the longitudinal axis of the actuator;
   a coupling having first and second ends, the first end being fixed to the actuator proximate to its free end, and the second end being fixed to the second link, the coupling adapted to transmit displacement in a direction substantially parallel to the longitudinal axis of the actuator; and
   an objective fixed to the reference structure, wherein the objective is between a light source and a position sensor, and the position sensor measures displacement of the objective in a direction generally perpendicular to the longitudinal axis of the actuator.

45. An optical apparatus for measuring movement of an actuator in a metrology apparatus, the optical measuring apparatus comprising:
   an objective fixed to a reference structure coupled to the actuator;
   a light source that generates a light beam, wherein the optical measuring apparatus changes the direction of the beam in response to movement of the objective;
   a position sensor that detects the beam and generates a displacement signal indicative of movement of the actuator in a direction generally perpendicular to a longitudinal axis of the actuator; and
   wherein a sample is coupled to the actuator; and
   and wherein said reference structure moves in the direction generally perpendicular to the longitudinal axis of the actuator.

46. A method for measuring movement of an actuator in a metrology apparatus, the method comprising:
   providing an objective mounted on a reference structure coupled to the actuator;

measuring movement of the objective, wherein movement of the objective is indicative of movement of the actuator in a direction generally perpendicular to the longitudinal axis of the actuator; and wherein a sample is coupled to the actuator via a multiple bar linkage so that movement of the actuator in the direction when the actuator is excited to move in a direction coincident with the longitudinal axis of the actuator is substantially decoupled from the sample.

47. The method of claim 46, wherein the measuring step further comprises:

generating a light beam from a stationary light source;

changing the direction of the beam in response to movement of the objective;

detecting the location of the beam with a position sensor; and generating a displacement signal indicative of movement of the actuator.

* * * * *